Nov. 19, 1968  J. W. STEVENS  3,411,456
DIFFERENTIAL CONVEYOR AND METHOD OF SPACING OBJECTS
Filed July 1, 1966
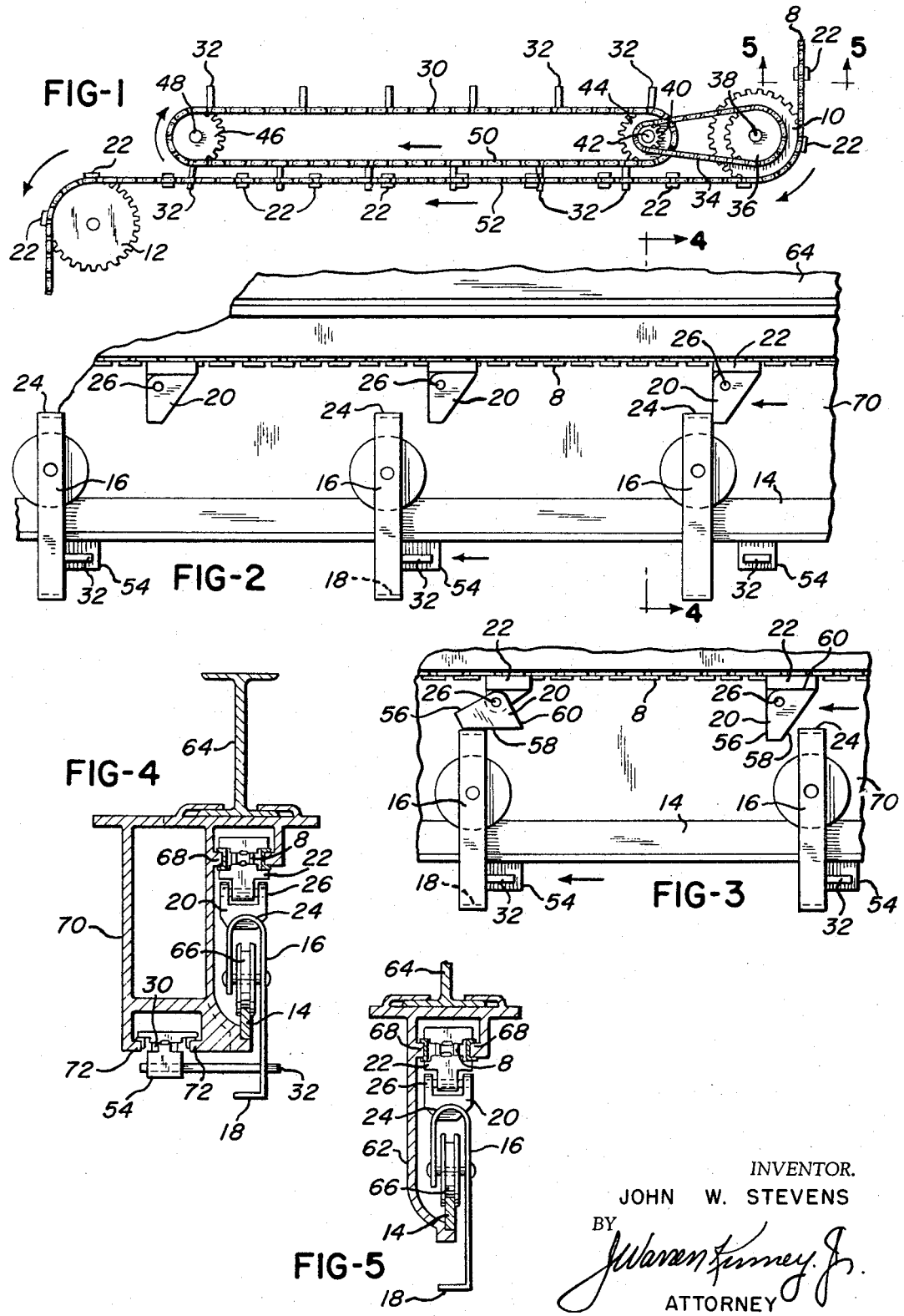
INVENTOR.
JOHN W. STEVENS
BY
J. Warren Kinney Jr.
ATTORNEY

United States Patent Office

3,411,456
Patented Nov. 19, 1968

3,411,456
DIFFERENTIAL CONVEYOR AND METHOD
OF SPACING OBJECTS
John W. Stevens, Cincinnati, Ohio, assignor to Cincinnati
Butchers' Supply Company, Cincinnati, Ohio, a corporation of Ohio
Filed July 1, 1966, Ser. No. 562,227
7 Claims. (Cl. 104—91)

ABSTRACT OF THE DISCLOSURE

Article-bearing trolleys are moved along a continuous rail by pushers mounted in predetermined spaced relation on an endless conveyor of a certain length traveling at a predetermined speed. Intermediate said certain length a second conveyor having fingers thereon spaced farther apart than said pushers and traveling at an accelerated speed contacts the trolleys and moves them along the rail faster than they were being moved by the pushers and also at greater spaced intervals. Since the second conveyor is shorter than the first conveyor the trolleys at the end of the second conveyor are again contacted by the pushers and moved thereby in respaced relation.

---

This invention relates to a differential spacing conveyor and method of spacing objects such as load carriers or trolleys along a supporting rail.

In general, the apparatus comprises an overhead rail or track of indeterminate length, with which is associated a primary conveyor moving in one direction at a substantially constant speed, for advancing a series of load carriers along the rail with uniformity of spacing of the carriers one from another. The load carriers may be in the form of trolleys arranged to suspend articles for transport along the length of the rail.

Apparatus of the character referred to is commonly used in meat processing or dressing plants, for moving carcasses successively to various stations at which different operations are performed upon the carcasses. The invention, however, is not necessarily limited to such use, since as will become apparent from the following description, articles other than carcasses might be conveyed from place to place in a like manner.

An object of the invention is to provide means in association with conveyor apparatus of the character stated, whereby load carriers may be re-arranged to temporarily increase the spacing between them along a selected section of the rail, and then restore the normal spacing of the carriers, without altering the normal capacity per hour of the conveyor apparatus as a whole, to advance articles through the processing routine.

Another object of the invention is to achieve the differential spacing of articles as above referred to, using simple yet reliable mechanism which may be furnished at low cost, and installed with a minimum expenditure of time and effort upon existing or new conveyor systems.

Another object is to facilitate and expedite the work of processing or inspecting articles advanced routinely through the processing plant.

A further object of the invention is to provide a differential spacing apparatus as and for the purposes stated, which is extremely reliable in operation, and practically free of servicing requirements throughout extended periods of use.

The foregoing and other objects are attained by the means described herein and illustrated upon the accompanying drawing, in which:

FIG. 1 is a top plan view of the differential spacing conveyor apparatus embodying the present invention.

FIG. 2 is an enlarged fragmentary side view of a small section of the conveyor apparatus.

FIG. 3 is a view similar to FIG. 2, indicating the displacement of a pusher as occurs during normal operation of the conveyor apparatus.

FIG. 4 is a cross-section taken on line 4—4 of FIG. 2.

FIG. 5 is a cross-section, on an enlarged scale, and taken on line 5—5 of FIG. 1.

With reference to FIG. 1, the numeral 8 indicates a primary conveyor preferably in the form of a chain, trained about a pair of sprockets 10 and 12 rotatable in a common horizontal plane. One or both of the sprockets may be a driver, for advancing the chain from right to left as indicated by arrows applied to the drawing; or if desired, the chain may be advanced by driving means other than the sprockets shown. Ordinarily, the primary conveyor chain may extend throughout the major portion of a processing plant, for moving carcasses or other objects along rails such as 14, by means of trolleys or carriers 16, FIGS. 2 to 5. The carcasses or objects, suspended from the lower end portions 18 of the trolleys, thereby may be passed through various operating stations in succession.

Pusher elements or fingers 20 carried by the primary conveyor 8, are adapted to engage the upper end portions 24 of the trolleys (see right end of FIG. 2), for advancing the trolleys from right to left along rail 14. As long as a pusher 20 remains in the position stated for advancing a trolley, the trolley will move at a rate determined by the linear speed of conveyor chain 8, which establishes the output rate of the conveyor apparatus. The pushers or fingers 20 usually are spaced from one another uniformly along the length of conveyor chain 8, and are pivoted at 26 upon lugs 22 fixedly secured to the chain. Thus, the pushers when engaging a succession of trolleys 16, would perform to advance the trolleys in equally spaced relation along a trolley rail.

It is considered desirable, however, to establish an increased spacing of the trolleys at one or more stations along the length of primary conveyor 8, in order to temporarily render more accessible the articles or carcasses suspended from the trolleys. Such increased spacing may be effected by means of a booster conveyor 30, which includes a series of booster fingers 32 spaced from one another a distance greater than the distance between successive lugs 22 of the primary conveyor 8, and arranged to advance at a linear speed greater than the linear speed of the primary conveyor.

As proposed by FIG. 1, conveyor 30 may be driven at a greater linear speed than conveyor 8, by means of a chain 34 transmitting motion from a large sprocket 36 on shaft 38, to a smaller sprocket 40 on shaft 42. Shaft 42 thereby is rotated at a higher speed than shaft 38.

A sprocket 44 keyed on shaft 42, and a sprocket 46 on shaft 48, support the booster conveyor 30 with its reach 50 in spaced parallelism with the reach 52 of primary conveyor 8. The reach 52 of conveyor 8 extends between sprockets 10 and 12, and constitutes a station or section of the primary conveyor at which trolleys and any articles suspended therefrom are to enjoy a maximum spacing determined by successive booster fingers 32. That is, trolleys disposed along the reach 52 of the primary conveyor, will be advanced by the booster conveyor fingers 32, rather than by means of the more slowly advancing pushers 20, with an increased spacing occurring between successive trolleys. This results in presenting articles or carcasses adequately spaced apart at station or section 52, so that they may easily be inspected or worked upon by attendants located at the maximum spacing station 52. The maximum spacing station 52 may be quite extensive in length, for example thirty feet, more or less. The reach 50 of the booster conveyor is shorter than the length of primary conveyor reach 52.

The booster fingers 32 are rigidly attached to chain 30 so as to extend outwardly therefrom at approximately a right angle, and the reach 50 of chain 30 is disposed in spaced parallelism with conveyor reach 52 so as to enable the fingers 32 to contact the trolleys 16 and advance them, as in FIG. 2, along rail 14 free of the influence of pushers 20. Fingers 32 may be rigidly attached to lugs 54 secured to booster conveyor chain 30, said lugs being uniformly spaced from one another a distance greater than the distance between successive pushers 20, as previously explained.

The reach 50 of booster conveyor 30 travels in the same direction as reach 52, but at a greater linear speed. Accordingly, with reference to FIG. 2, booster fingers 32 will advance the trolleys 16 ahead of pushers 20, may be required to pass some of the pushers 20, and this is made possible by hinging the pushers at 26, FIG. 3 to permit passage of the trolley.

At the left in FIG. 3 is shown a pusher displaced in clockwise direction about its pivot 26, as trolley 16 advances to the left at a speed greater than chain 8 and its lug 22. The pusher 20 includes a leading edge 56 to strike and advance a trolley, and a trailing edge 58 to override the trolley harp 24 as the trolley overtakes the pusher. In the normal position of the pusher 20, shown at the right in FIG. 3, an abutment edge 60 of the pusher stops against lug 22 to limit counter-clockwise rotation of the pusher about pivot 26. The pusher is free to rotate in the opposite direction, to the displaced position shown at the left in FIG. 3, as trolley 16 overtakes and passes the pusher. As the trolley passes beyond pusher 20, the pusher drops by gravity to the normal or extended position, or if desired, the pusher may be returned to the normal or extended position by spring action.

It should be noted that FIG. 1 does not show the trolleys 16, although it does show the lugs 22 which carry the pivoted pushers 20 that advance the trolleys. FIG. 1 indicates how the booster conveyor fingers 32 gradually overtake and pass the lugs 22 of the primary conveyor 8, due to the difference in speed of conveyors 30 and 8.

FIGS. 4 and 5 furnish a disclosure of certain details concerning supports for the conveyors 8 and 30, and the rail 14. A hanger 62, FIG. 5 is rigidly suspended vertically from a horizontal supporting beam 64, and carries the rail 14 upon which may ride the roller 66 of trolley 16. The height of rail 14 is such that the harp 24 of the trolley may be struck and advanced by the pivoted pusher 20. The hangar includes also a track 68 for horizontally supporting the primary conveyor chain 8, to preclude sagging of said chain and its lugs 22.

The hanger 70 of FIG. 4 likewise may be rigidly suspended from a beam 64, and includes also a supporting track 68 for primary conveyor chain 8. In addition, hanger 70 carries a second track 72 to horizontally support the booster conveyor chain 30, thereby preventing sagging of said chain 30 and its lugs 54 carrying the booster fingers 32. As FIG. 4 clearly indicates, the booster fingers 32 extend horizontally a distance sufficient to engage the trolleys 16, for advancing the trolleys independently of the action of pushers 20. Hangers such as 70, which include the double tracks 68 and 72, are used along the length of the spacing station defined by the length of booster conveyor 30.

In the operation of the apparatus, trolleys and the articles suspended thereon will be advanced by pushers 20, to and about the sprocket 10 at a minimum spacing of perhaps two feet. As the trolleys reach the location of booster conveyor 30, the fingers 32 in traveling faster than the primary conveyor 8, will overtake and pass the lugs 22 and pushers 20, thereby to advance the trolleys at a greater speed. Since booster fingers 32 are spaced apart a distance greater than the the spacing of pushers 20, for example three feet, the trolleys will be advanced along rail 14 at the greater spacing distance. This greater spacing of the articles along the length of the booster conveyor, will enable attendants to move freely amongst the advancing articles to facilitate inspection or further treatment of the articles.

When the articles reach the tail end of the booster conveyor, which is located at the approximate location of sprocket 46, the booster fingers 32 will leave the path of trolley advancement, and thereby permit the primary conveyor pushers 20 to retrieve the trolleys one by one, for advancing the trolleys at the original speed and with the original minimum spacing restored. Thus, the trolleys will advance beyond sprocket 12 at the same speed and spacing at which they approached the booster conveyor. The trolleys and the articles or carcasses suspended thereon, will accordingly pass routinely along the primary conveyor system without interruption of the overall output capacity of the primary conveyor, although the articles or carcasses were temporarily spaced apart an increased distance at the booster conveyor station, and temporarily accelerated in speed of advancement.

The apparatus disclosed will facilitate and expedite thorough inspection or treatment of articles or carcasses at the booster conveyor section, and by reason of its simplified and durable construction, will offer reliable and trouble-free service.

What is claimed is:

1. A differential spacing conveyor apparatus for exhibiting a succession of articles with expanded spacing therebetween, said apparatus comprising a continuous trolley rail; a longitudinally movable primary conveyor in spaced parallelism with the rail; a succession of article-bearing trolleys movable along the tail; a succession of like spaced pusher elements on said primary conveyor adapted each to contact a trolley and advance it along the rail at a predetermined rate of speed, with the trolleys spaced in correspondency with the spacing between the pusher elements; a booster or second conveyor also movable in spaced parallelism with the rail and disposed along a longitudinal intermediate selection section thereof, said second conveyor being movable at a greater linear speed than said predetermined speed, and a succession of booster fingers extending from said second conveyor into the path of advancement of the trolleys disposed along said selected section of the rail and contacting and advancing the trolleys along the rail independently of the advancement of said pusher elements, said booster fingers being spaced from one another a distance greater than the spacing of said pusher elements, whereby the trolleys in said selected section of the rail are removed from the influence of the pusher elements and moved at an accelerated speed along the rail and thereafter released again to the action of the pusher elements to restore the original spacing of said trolleys on the rail.

2. Apparatus as specified by claim 1, wherein the pusher elements are displaceable from the path of accelerated advancement of the trolleys on the rail, and movable thereafter into said path of advancement following a displacement effected by an accelerated trolley.

3. Apparatus as specified by claim 1, wherein said second movable conveyor comprises a pair of spaced sprockets, and an endless chain carrying said fingers trained about said sprockets; and means driven by the primary conveyor for rotating one of the sprockets of said pair.

4. Apparatus as specified by claim 2, wherein said second movable conveyor comprises a pair of spaced sprockets, and an endless chain carrying said fingers trained about said sprockets; and means driven by the primary conveyor for rotating one of the sprockets of said pair.

5. Apparatus as specified by claim 1, wherein the booster finger means in expanding the spacing between successive trolleys, accelerates advancement of the trolleys on the rail above the speed of advancement of the primary conveyor pusher elements.

6. Apparatus as specified by claim 5, wherein the pusher elements carried by the primary conveyor are displaceable from the path of accelerated advancement of the trolleys on the rail, and movable thereafter into said path of advancement following a displacement effected by an accelerated trolley.

7. The apparatus as specified by claim 1, wherein is included hanger means for supporting the chains of the conveyors against sagging, and in elevated position adjacent to the trolley rail.

References Cited

UNITED STATES PATENTS 2,335,790  11/1943  Ransburg _____ 104—91
2,383,835   8/1945  Ackermann _____ 104—89

ARTHUR L. LA POINT, *Primary Examiner.*